United States Patent
Wu et al.

(10) Patent No.: US 11,385,888 B1
(45) Date of Patent: Jul. 12, 2022

(54) UPDATING CONTAINER RUNTIME USING STANDBY VIRTUAL MACHINES

(71) Applicant: VMware, Inc., Palo Alto, CA (US)

(72) Inventors: Junfei Wu, Beijing (CN); Xiaodong Ye, Beijing (CN); Zhaokai Yuan, Beijing (CN); Chen Liu, Beijing (CN); Kai Xiang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/186,284

(22) Filed: Feb. 26, 2021

Related U.S. Application Data (63) Continuation of application No. PCT/CN2021/072815, filed on Jan. 20, 2021.

(51) Int. Cl.
  *G06F 8/65* (2018.01)
  *G06F 9/455* (2018.01)
  *H04L 41/082* (2022.01)

(52) U.S. Cl.
  CPC ............ *G06F 8/65* (2013.01); *G06F 9/45558* (2013.01); *H04L 41/082* (2013.01); *G06F 2009/45562* (2013.01); *G06F 2009/45575* (2013.01)

(58) Field of Classification Search
  CPC .................. G06F 8/65; G06F 9/45558; G06F 2009/45562; G06F 2009/45575; H04L 41/082
  See application file for complete search history.

(56) References Cited

U.S. PATENT DOCUMENTS

| | | | |
|---|---|---|---|
| 2017/0206071 A1* | 7/2017 | Kirkpatrick | G06F 9/44521 |
| 2017/0206090 A1* | 7/2017 | Kirkpatrick | G06F 9/546 |
| 2017/0344289 A1* | 11/2017 | Jeong | G06F 16/188 |
| 2018/0060057 A1* | 3/2018 | Dake | G06F 9/45516 |
| 2021/0058338 A1* | 2/2021 | Liu | H04L 41/0803 |
| 2021/0279111 A1* | 9/2021 | Ranjan | G06F 9/45558 |

OTHER PUBLICATIONS

Spillane et al., Exo-clones: Better Container Runtime Image Management across the Clouds (Year: 2016).*

* cited by examiner

*Primary Examiner* — Phillip H Nguyen (57) ABSTRACT

Described herein are systems, methods, and software to manage the updates for a container runtime. In one example, a host identifies a request to update a container runtime from a first version to a second version for a container executing in a virtual machine. The host further initiates execution of a second container in a second virtual machine with the second version of the container runtime, wherein the second container uses the same root filesystem as the first container. The host also updates any required networking configurations to direct communications to the second container over the first container and stops execution of the first container.

20 Claims, 8 Drawing Sheets

UPDATING CONTAINER RUNTIME USING STANDBY VIRTUAL MACHINES

RELATED APPLICATIONS

This application is a continuation of and claims benefit from and priority to PCT Application Serial No. PCT/CN2021/072815 filed in China entitled "UPDATING CONTAINER RUNTIME USING STANDBY VIRTUAL MACHINES", on Jan. 20, 2021, which is herein incorporated in its entirety by reference for all purposes.

BACKGROUND

Containers, such as Docker™ Containers, Linux containers, or other types of containers, provide an efficient mechanism to deploy applications in a computing environment. Containers are used to isolate software from its environment to ensure that the application can execute regardless of infrastructure. Unlike virtual machines, which contain an operating system, containers include the necessary executables, binary code, libraries, and other configuration files to execute the application in the container without dependencies from outside the container.

When deployed in a computing environment, containers use a container runtime to provide required functionality. The container runtime is software that runs and manages the components required to execute containers. This software may include networking services, resource management services, or some other service to support the services or applications in the container. In some implementations, the container runtime may require an update to provide fixes to the runtime, provide additional features to the runtime, or provide some other functionality. However, these updates can cause downtime in the execution of the containers as the container must be stopped while the container runtime is updated.

OVERVIEW

The technology disclosed herein manages container runtime updates using standby virtual machines. In one implementation, a method includes identifying a request to update a container runtime from a first version to a second version for a first container executing in a first virtual machine, wherein the first container uses a first root filesystem. In response to identifying the request, the method further provides initiating execution of a second container in a second virtual machine with the second version of the container runtime, wherein the second container uses the first root filesystem. Once initiated, the method updates a networking configuration to direct communications to the second container in place of the first container and stops execution of the first container.

DETAILED DESCRIPTION

Figure 1:
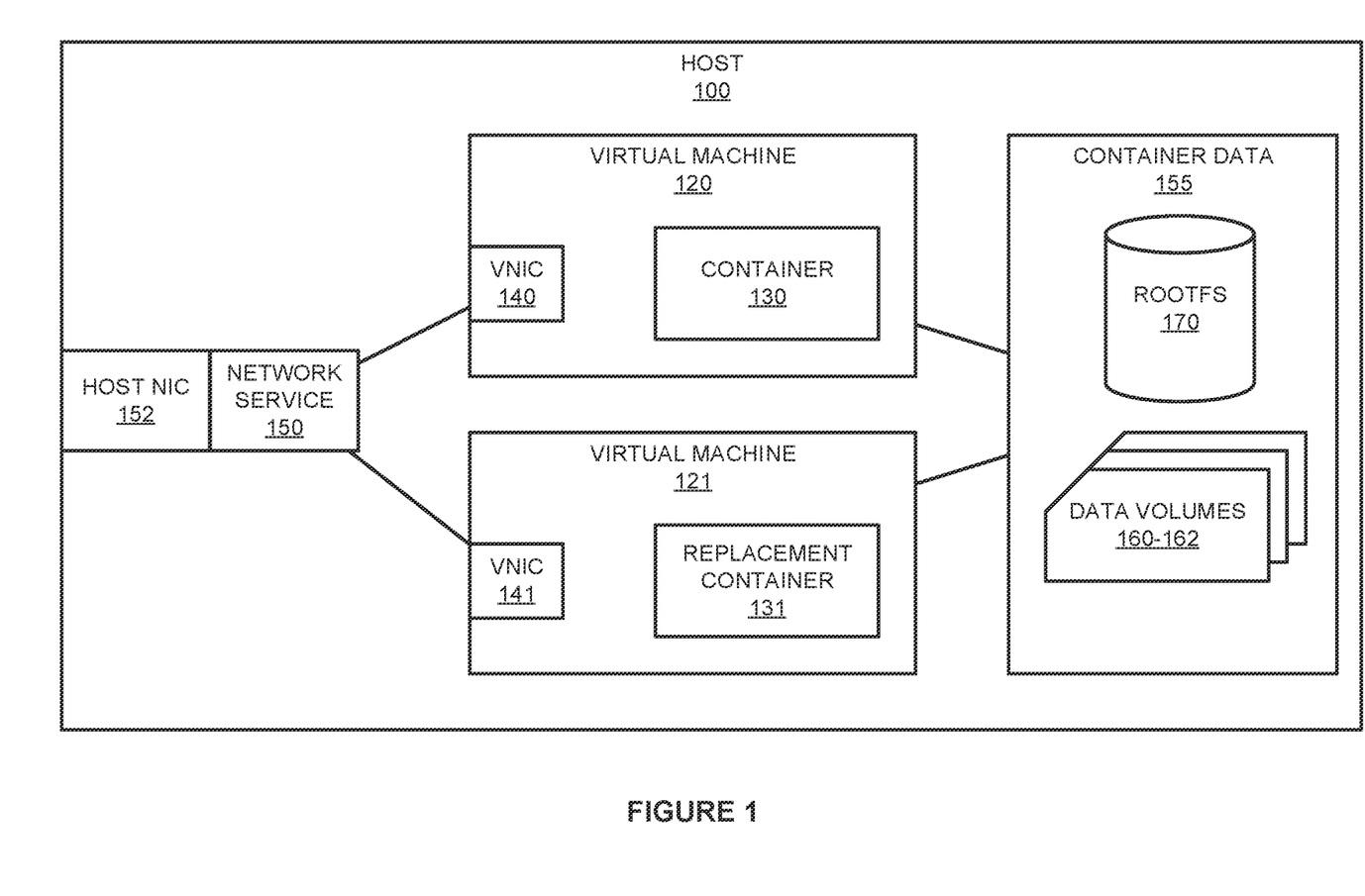
FIG. 1 illustrates a host capable of updating a container runtime using standby virtual machines according to an implementation.

FIG. 1 illustrates a host 100 capable of updating a container runtime using standby virtual machines according to an implementation. Host 100 includes host network interface (host NIC) 152, network service 150, virtual machines 120-121, and container data 155. Virtual machines 120-121 further include virtual network interfaces (VNICs) 140-141 and containers 130-131. Container data 155 further includes root filesystem (rootfs) 170 and data volumes 160-162 that can be mounted to containers executing on host 100. Host 100 may comprise a desktop computer, a server computer, a laptop computer, or some other computer capable of supporting the virtual machines and the containers.

In operation, container 130 is executed in virtual machine 120, wherein container 130 may provide various operations including microservices, web database services, front-end services, or some other application or service. To support the execution of the application or service, virtual machine 120 includes a container runtime that is used to provide components to the application, such as networking services, resource management services, or some other services. Container 130 may include executables, binary code, libraries, and other configuration files to support the execution of the application or service. In the example of container 130, container 130 uses rootfs 170 and further has data volumes 160-162 mounted and accessible to container 130. Volumes 160-162 may comprise physical disks, partitions, virtual disks, or some other volume accessible to container 130. Although demonstrated as local to host 100, it should be understood that data volumes 160-162 may comprise a network storage element capable of being mounted to the container in the virtual machine.

As container 130 executes in virtual machine 120, a request may be identified to update the container runtime. The update request may be generated by a user of host 100, pushed to host 100 from another computing system, or provided in some other manner. To support the request and minimize disruptions caused by the update, host 100 may initiate a replacement virtual machine 121 with replacement container 131 that can be used to handover the operations of container 130. In particular, replacement container 131 may use an updated version of the container runtime, wherein the updated version may include updated networking services, resource management services, or some other services. In some examples, virtual machine 121 and replacement container 131 may be initiated with the updated services. In other examples, virtual machine 121 may be initiated with an older version of the container runtime and update the container runtime to make replacement container 131 available to replace container 130. Replacement container 131 uses the same rootfs 170 as container 130 and further mounts data volumes 160-162 that are used by container 130.

Once replacement container 131 is initiated and available with the updated container runtime, host 100 may initiate operations to retire container 130 and virtual machine 120.

In some implementations, network service 150 may be updated to reflect port forwarding changes for packets received at host NIC 152. In particular, host 100 may identify an IP address for virtual machine 121 and VNIC 141 and update network service 150 to communicate packets to virtual machine 121 in place of virtual machine 120. Although this is one example of an updated networking configuration, it should be understood that other updates may be implemented by host 100 including firewall updates or some other updates to use virtual machine 121 in place of virtual machine 120. In updating network service 150, a port may be used to identify a packet destined for the container, perform network address translation for the IP address in the packet and forward the packet to the associated virtual machine. In some implementations, virtual machines 120-121 may comprise optimized virtual machines to support containers 130-131, however, it should be understood that the virtual machine may comprise any virtual machine. When a packet is received at VNIC 140-141, the virtual machine may forward the packet to a linked interface for the container.

While demonstrated in the example of FIG. 1 with a single replacement container and virtual machine for an existing virtual machine and container, it should be understood that the operation may be repeated as necessary to update the container runtime for a plurality of containers. In some implementations, the host, for each container that requires an update, may initiate a new virtual machine with an updated runtime for the container. Once a replacement container is initiated with the appropriate rootfs and mounted data volumes, the networking configuration, if required, may be updated to use the replacement container in place of the existing container, wherein the update may be used to forward packets to the replacement virtual machine in place of virtual machine. Once the replacement container is initiated and any networking configuration is updated, the existing virtual machine and container can be retired by stopping or deleting the virtual machine. In some implementations, host 100 may determine when the container runtime for every container has been updated using the replacement containers or virtual machines. This determination may be made when packets are no longer being forwarded to or received at the virtual machines, which can be identified using timeouts for packets neither being sent or received by the virtual machine. Once the runtime is updated, data, such as files and directories associated with the previous version of the runtime, may be deleted from host 100.

Figure 2:
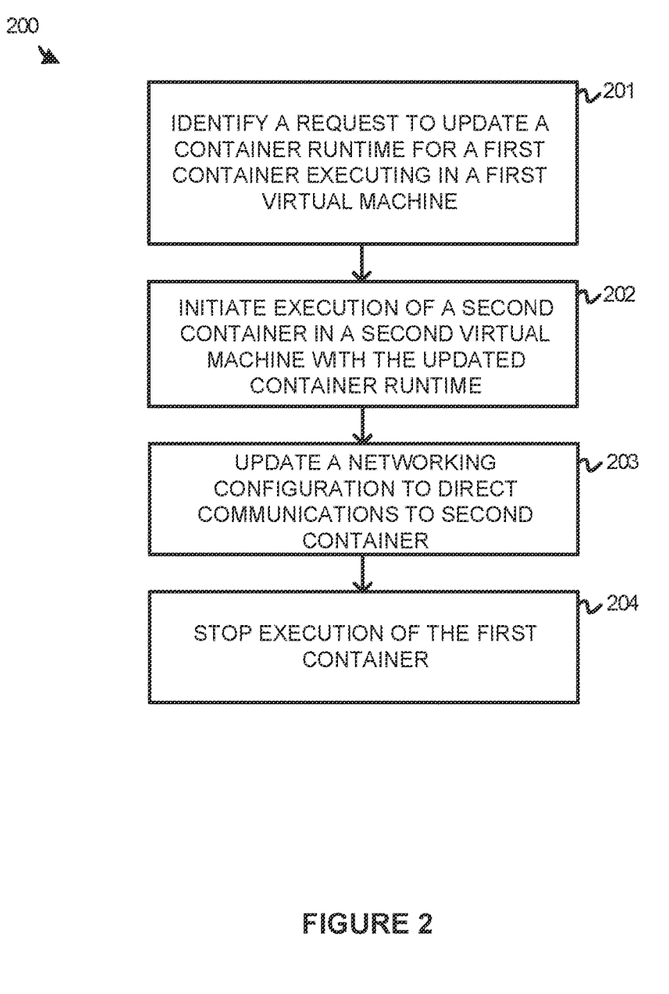
FIG. 2 illustrates a method of updating a container runtime using standby virtual machines according to an implementation.

FIG. 2 illustrates a method 200 of updating a container runtime using standby virtual machines according to an implementation. The steps of method 200 are referenced parenthetically in the paragraphs that follow with reference to systems and elements of host 100 of FIG. 1.

As depicted, method 200 includes identifying (201) a request to update a container runtime from a first version to a second version for a first container executing in a first virtual machine, wherein the first container uses a first root filesystem. The request may be obtained from a user of host 100, pushed from an external server indicating the update, or identified in some other manner. In response to identifying the request, method 200 further initiates (202) execution of a second container in a second virtual machine with the second version of the container runtime, wherein the second container uses the first root filesystem. In some implementations, virtual machine 121 may be initiated with the same container runtime as virtual machine 120 and subsequently update the container runtime. In other implementations, the image for virtual machine 121 may include the updated runtime required for replacement container 131.

As an example, using host 100, a request is received to update the container runtime associated with container 130. In response to the request, virtual machine 121 is initiated with replacement container 131, wherein replacement container 131 is directed to rootfs 170 and mounts the applicable volumes 160-162 to replace container 130. For example, if container 130 used data volumes 160-161, replacement container 131 may mount the same data volumes 160-161 in preparation of replacing container 130.

Once the second container is initiated with the updated container runtime, the method updates (203) a networking configuration to direct communications to the second container in place of the first container and stops or retires (204) the execution of the first container. In some examples, containers may receive packets using port forwarding, wherein packets received at a port value may be forwarded to a virtual machine associated with the port value. To replace container 130, an IP address associated with VNIC 141 may be used to replace the IP address for VNIC 140 in network service 150. Accordingly, when a packet is received using the associated port, the packet may be forwarded to VNIC 141, in some examples using network address translation. Although described in the previous example as updating port forwarding, it should be understood that updates may further be provided to firewalls, NAT operations, or some other operations to communicate with replacement container 131. In some implementations, replacement container 131 may not require networking configuration changes if it does not communicate with external services. Instead, when container 131 is initiated, container 130 may be stopped or retired, permitting the execution of the application or service in replacement container 131 to assume responsibility for the application.

In some examples, multiple containers may require an updated runtime. As a result, host 100 may initiate a standby virtual machine with a standby container for each of the containers and repeat operation 200 for each of the containers. The update for each of the containers may be implemented in parallel, in serial, or in some other sequence. Once each of the containers is updated, any container runtime data that is not required for the new container runtime may be deleted or removed from the host.

Figure 3A:
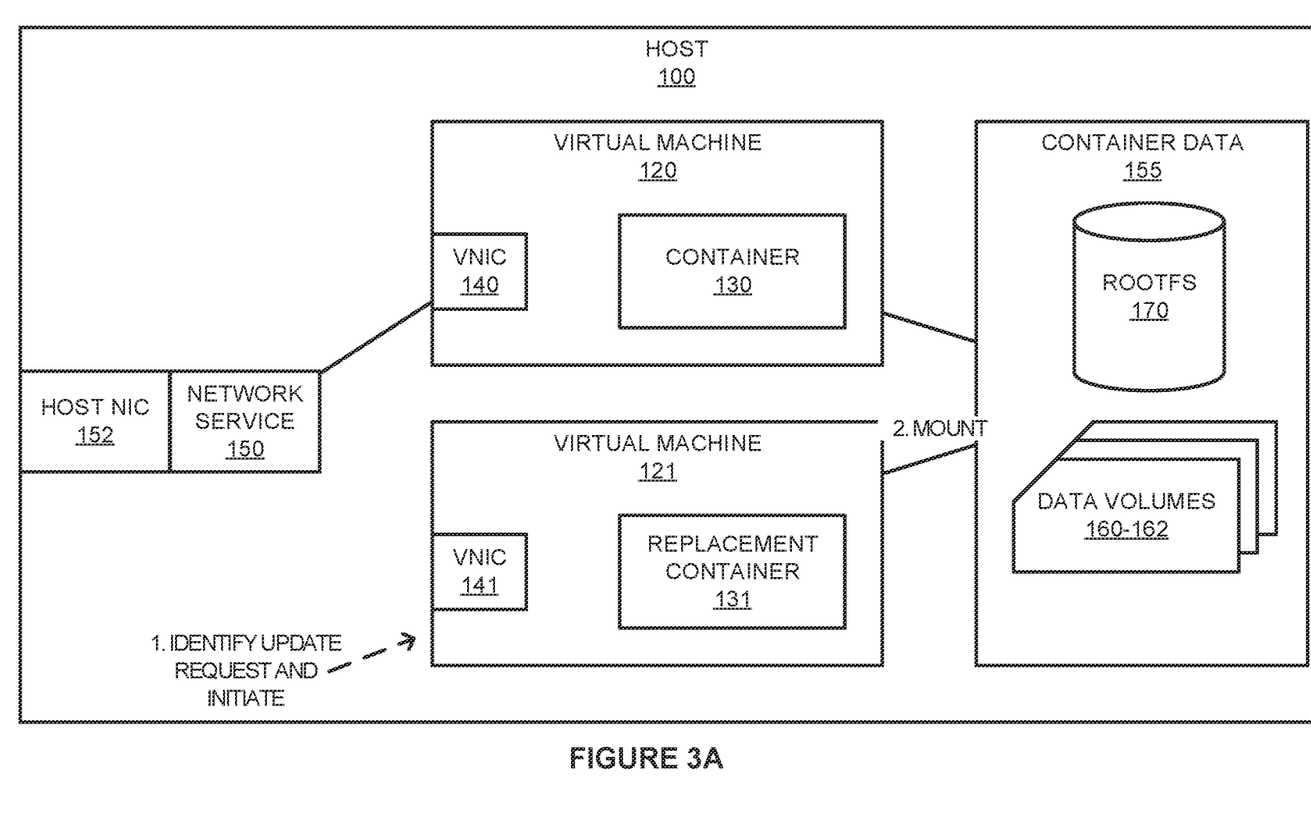
FIGS. 3A-3C illustrate an operational scenario of updating a container runtime for a container according to an implementation.
Figure 3B:
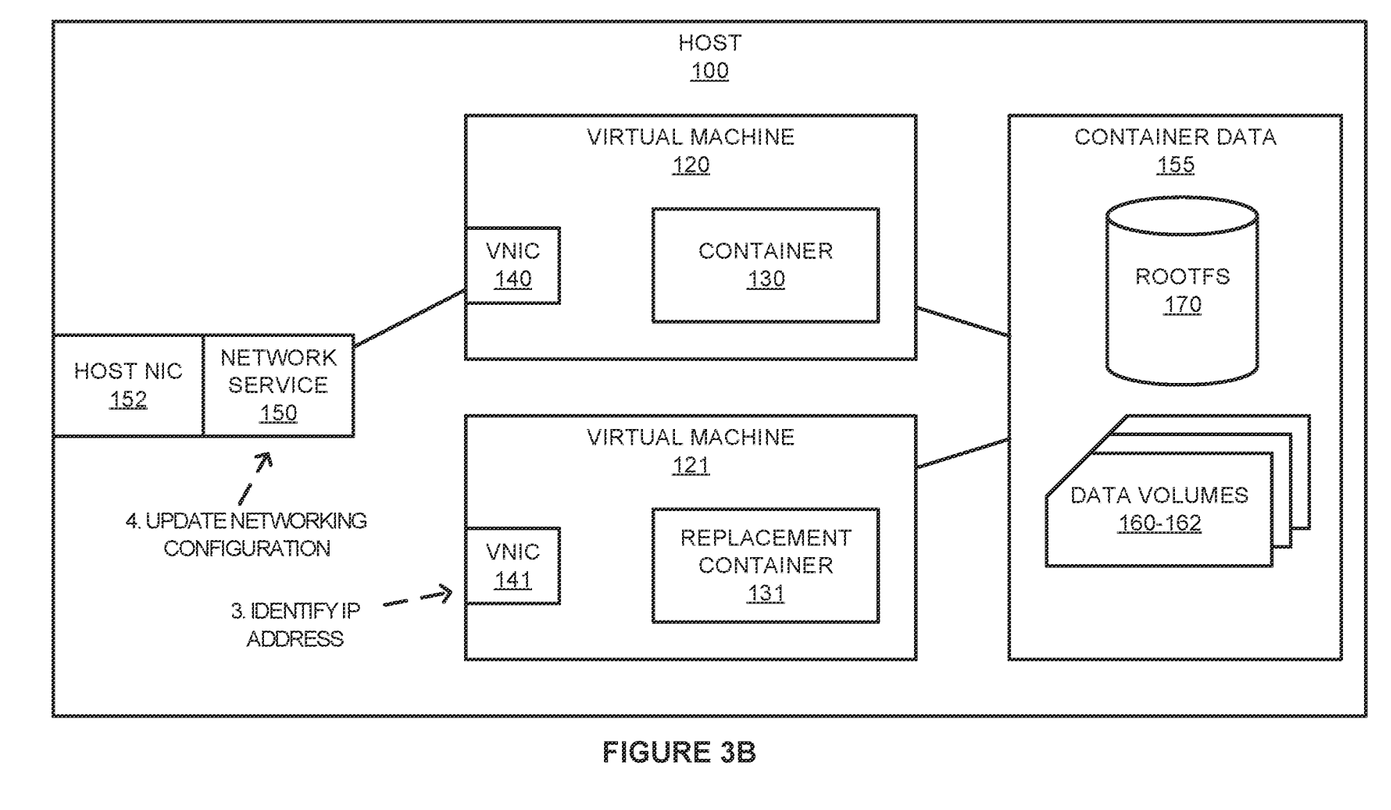
Figure 3C:
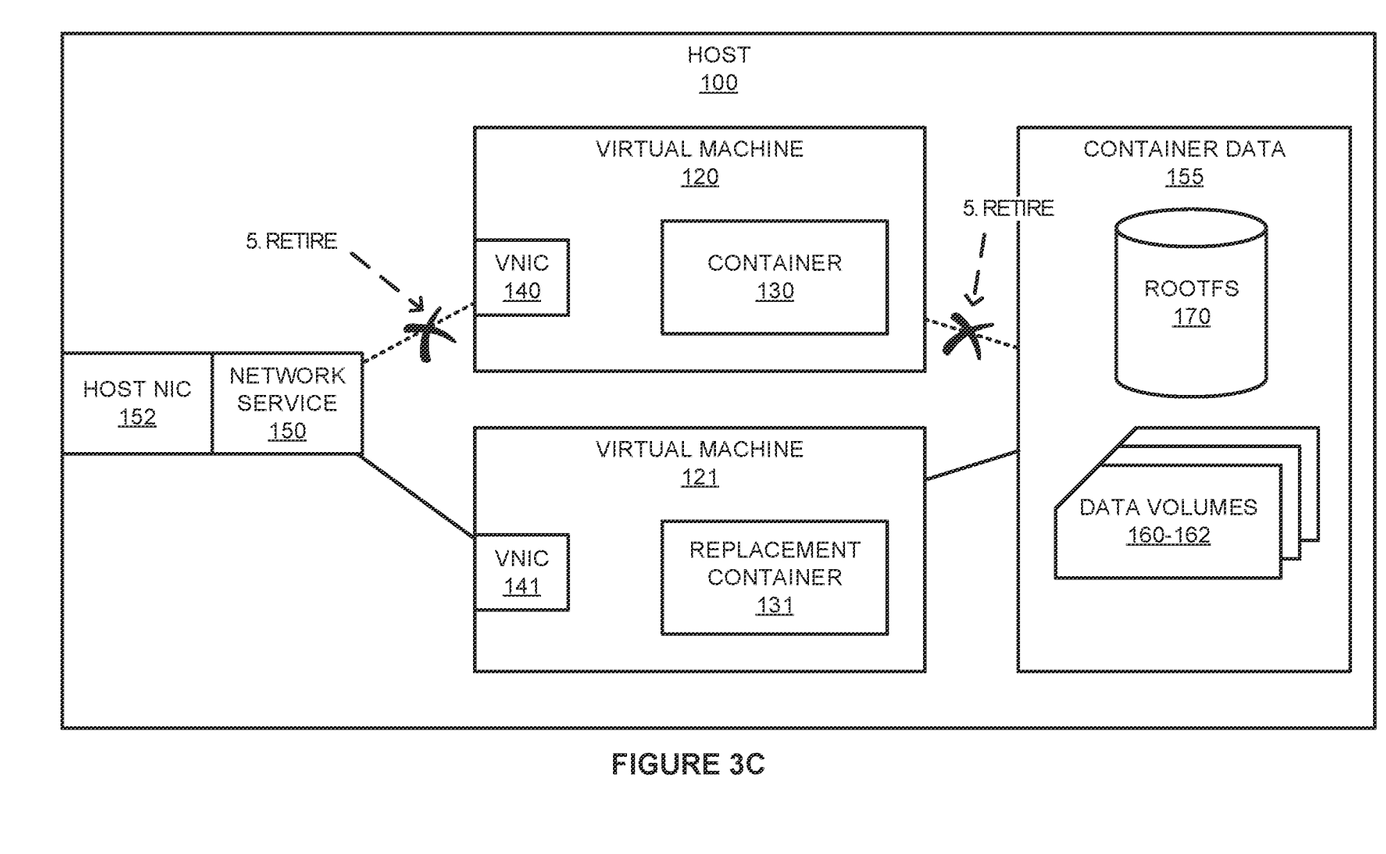

FIGS. 3A-3C illustrate an operational scenario of updating a container runtime for a container according to an implementation. The processes in the operational scenario includes elements from host 100 of FIG. 1.

Referring first to FIG. 3A, host 100 may identify, at step 1, an update request to for the container runtime associated with container 130 and, in response to the request, initiate virtual machine 121 with replacement container 131. In initiating virtual machine 121, replacement container 131 may be provided with a data path to rootfs 170 that can be stored locally on host 100 and includes the filesystem for replacement container 131 and container 130. Additionally, volumes mounted to container 130 are also mounted to replacement container 131, permitting access to the same data for both of the containers.

Turning to FIG. 3B, once replacement container 131 is initiated with access to rootfs 170 and data volumes 160-162, host 100 will identify an IP address allocated to virtual machine 121 and VNIC 141, at step 3, and update a networking configuration, at step 4. In some implementations, a container may rely on port forwarding to receive communications from other services. When replacement container 131 is active with the appropriate data and container runtime, host 100 may identify the IP address for VNIC 141 and update network service 150 to forward packets to the IP address associated with virtual machine 121 instead of virtual machine 120. In some implementations, the update to the networking configuration may update firewalls, routing tables, or some other information to redirect communications to virtual machine 121 in place of virtual machine 120.

Referring now to FIG. 3C, once replacement container 131 is available to replace container 130 and the networking configuration is updated, virtual machine 120 and container 130 can be retired. In particular, virtual machine 120 may be stopped or deleted, once virtual machine 121 is used to replace the operations of virtual machine 120 and container 130. Thus, when new a packet is received, network service 150 may forward the packet to VNIC 141 with replacement container 131 to provide replacement operations for container 130. In some implementations, a host may include multiple containers that each require an update. As a result, host 100 may update each of the containers using the operations described in FIGS. 3A-3B and, once updated using replacement virtual machines and containers, delete any unrequired files or data that was associated with the previous container runtime.

Figure 4:
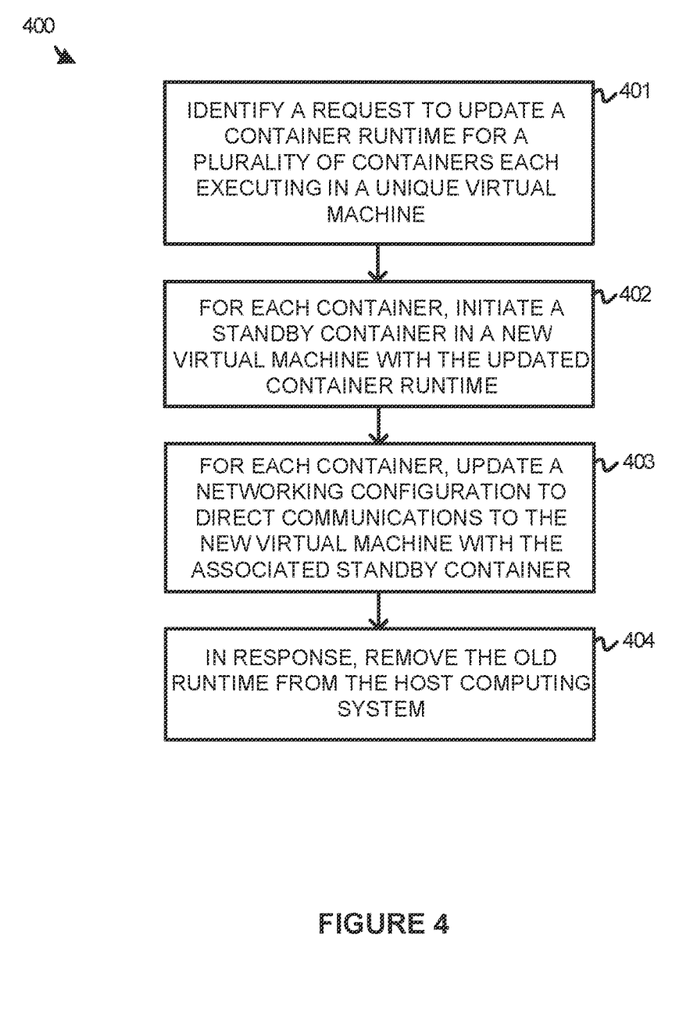
FIG. 4 illustrates a method of updating the container runtime for a plurality of containers according to an implementation.

FIG. 4 illustrates a method 400 of updating the container runtime for a plurality of containers according to an implementation. The steps of method 400 are referenced parenthetically in the paragraphs that follow.

As depicted, method 400 includes identifying (401) a request to update a container runtime for a plurality of containers each executing on its own unique virtual machine. In response to the request, method 400 further provides, for each container, initiating (402) a standby container in a new virtual machine with the updated container runtime. The standby container may access the same root filesystem as the container it is replacing and may further mount the same storage volumes, such that the standby container has access to the same data as the container it is replacing. In some implementations, when the new virtual machine is initiated, the virtual machine may include the updated container runtime. In other implementations, the new virtual machine may be initiated, and the container runtime updated after initiation. The initiation of the new virtual machines may occur in parallel, in serial, or in some combination thereof.

As the new virtual machines are initiated with the standby containers, the method further includes, for each container, updating (403) a networking configuration to direct communications to the new virtual machine with the associated standby container. The update may include port forwarding update to direct communications to the IP address associated with the new virtual machine, update a firewall to permit communications to the new virtual machine, or some other networking configuration update. In some implementations, at least a portion of the containers may not require networking configuration modifications. Instead, an update may be completed when the container is executable with the updated container runtime.

Once the networking configuration is modified to direct communications to the standby containers, the host may stop the execution of the containers associated with the previous version of the container runtime. After stopping the execution of the containers and virtual machines associated with the previous version of the container runtime, method 400 further includes removing (404) unused data associated with the previous container runtime. Advantageously, the host may use the previous version of the container runtime, while new virtual machines and containers are initiated with the new container runtime. Although demonstrated in the example of FIG. 4 as removing the data associated with the previous version of the container runtime, it should be understood that the data may remain available on the host.

Figure 5:
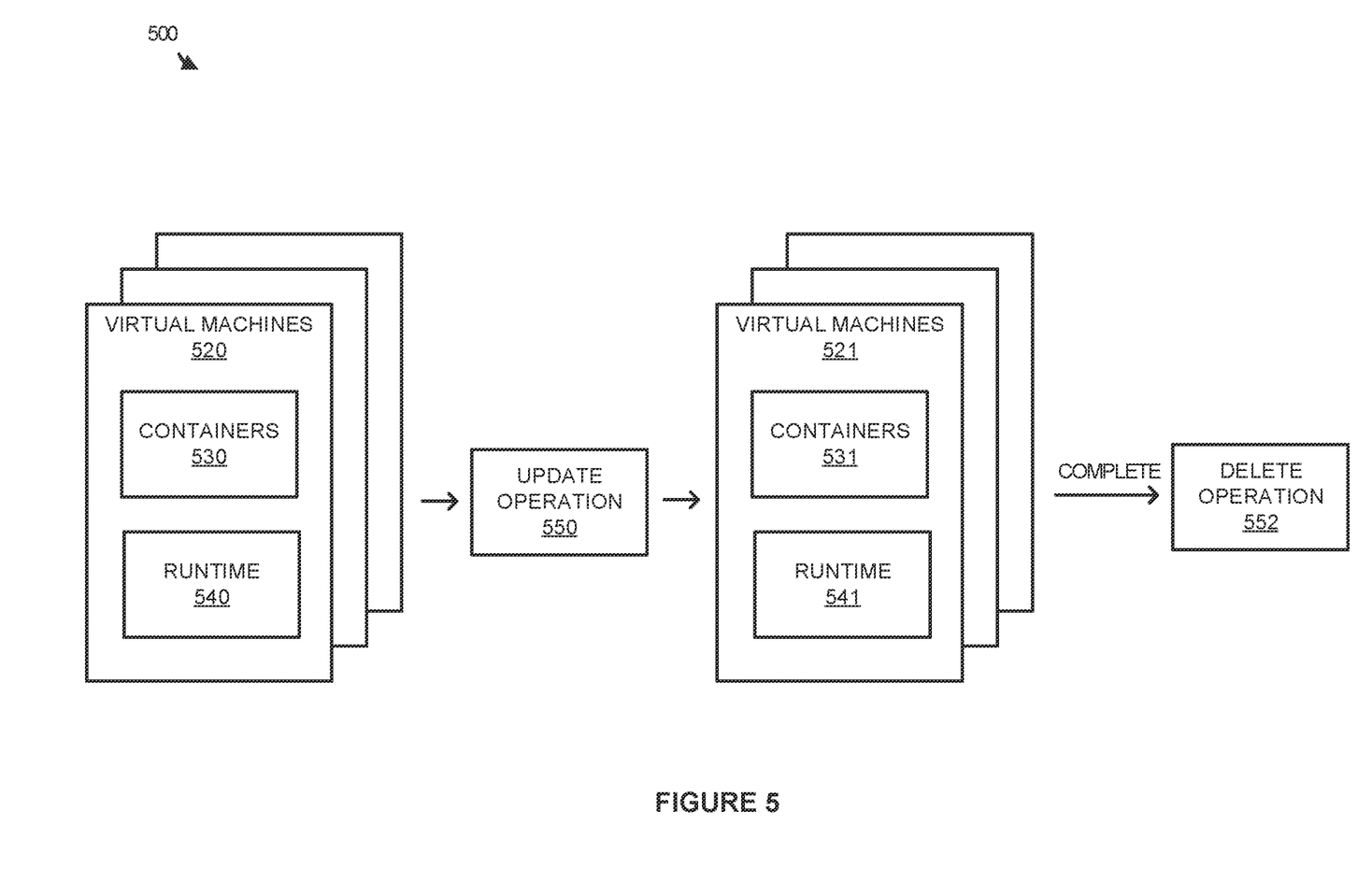
FIG. 5 illustrates an operational scenario of updating container runtime for a plurality of containers according to an implementation.

FIG. 5 illustrates an operational scenario 500 of updating container runtime for a plurality of containers according to an implementation. Operational scenario 500 includes virtual machines 520-521 with containers 530-531 and runtimes 540-541. Operational scenario 500 further includes update operation 550 and delete operation 552.

In operation, when a request is received to update a container runtime from container runtime 540 to container runtime 541, update operation 550 initiates virtual machines 521 that each correspond to a different virtual machine from virtual machines 520. Virtual machines 520 and virtual machines 521 may comprise optimized virtual machines for containers or may comprise some other type of virtual machine. Virtual machines 521 may be initiated in parallel, may be initiated in serial, or may be initiated in some other sequence. In some implementations, for each container of containers 530, update operation 550 may initiate a new virtual machine in virtual machines 521 with a new container that accesses the same root filesystem as the original container. The new container may further access, or mount, one or more storage volumes associated with the container from virtual machines 520, wherein the storage volumes may comprise partitions, a storage pool, a disk, a virtual disk, or some other type of volume.

As containers 531 are initiated in virtual machines 521, update operation 550 may update a networking configuration associated with the containers. The update may be used to forward communications to containers 531 in place of a corresponding container in containers 530. The update may include an update to a port forwarding configuration, an update to a firewall configuration, or some other update to the networking configuration. For example, when after initiating a standby container in containers 531, update operation 550 may identify an IP address for the virtual machine associated with the standby container and update a port forwarding configuration to forward packets to the container in containers 531 in place of the container in containers 530.

While updating the container runtime, delete operation 552 may monitor for when containers 531 have replaced all of containers 530. This monitoring may include determining when all of containers 531 are executing, determining when the networking configuration has been updated for all of the containers, or determining some other factor associated with completing the transition from containers 530 with runtime 540 to containers 531 with runtime 541. After determining that containers 531 have replaced containers 530, delete operation 552 may delete any unnecessary data associated with runtime 540. In some implementations, a host may maintain multiple copies of a runtime as required, wherein a runtime 540 may represent a first copy with first features and runtime 541 may represent an updated copy with second features. When the update is completed to executing containers 531 in place of containers 530, the host may delete the copy of runtime 540. In other implementations, the host may delete files or directories that are replaced are unused by runtime 541.

Figure 6:
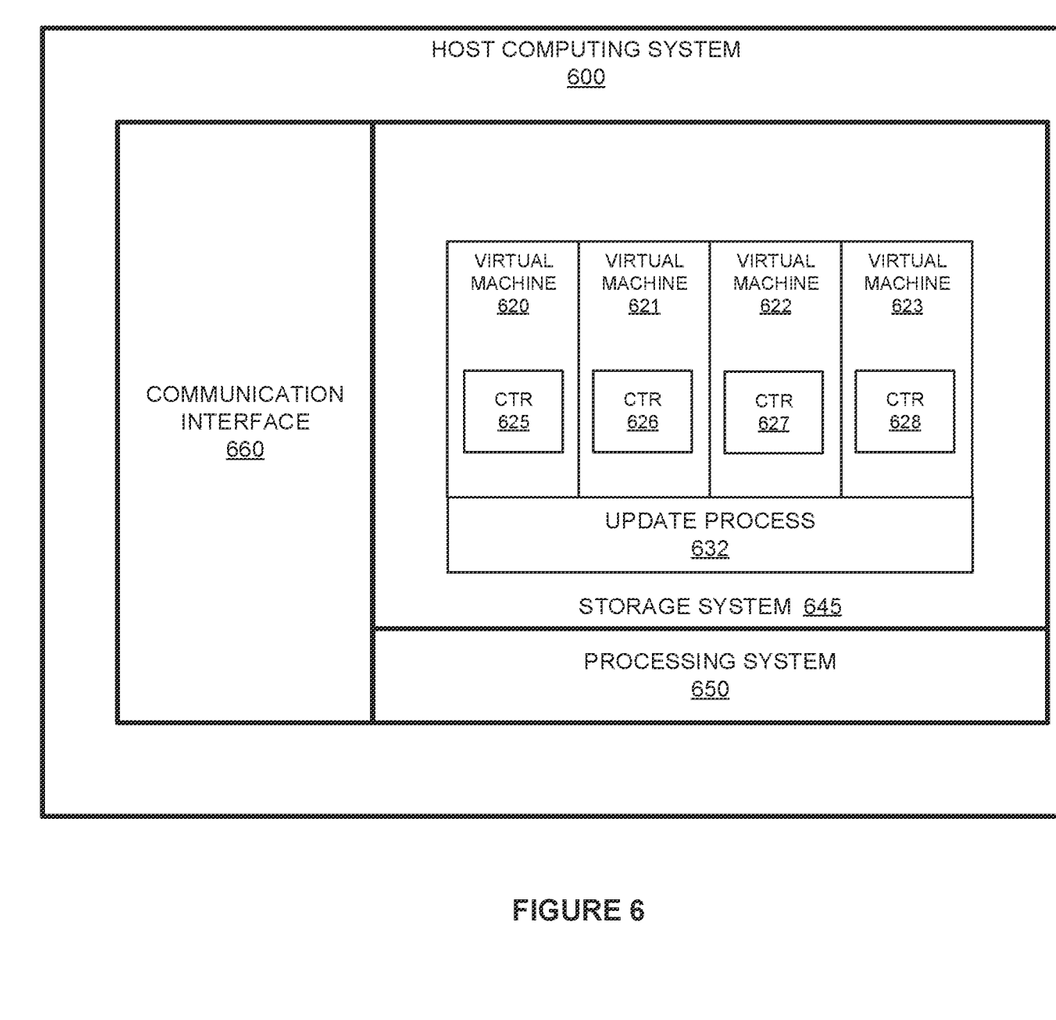
FIG. 6 illustrates a host computing system capable of managing the updates to container runtime according to an implementation.

FIG. 6 illustrates a host computing system 600 capable of managing the updates to container runtime according to an implementation. Host computing system 600 is representative of any computing system or systems with which the various operational architectures, processes, scenarios, and sequences disclosed herein for a host can be implemented.

Host computing system 600 is an example of host 100 of FIG. 1, although other examples may exist. Host computing system 600 includes storage system 645, processing system 650, and communication interface 660. Processing system 650 is operatively linked to communication interface 660 and storage system 645. Host computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with other computing systems, such as clients, other hosts, or some other computing element or device.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage systems 645 comprises computer programs, firmware, or some other form of machine-readable program instructions. The operating software of storage system 645 comprises update process 632 and virtual machines 620-623 with containers 625-628. The operating software on storage system 645 may further include utilities, drivers, network interfaces, applications, or some other type of software. Although illustrated as separate in the present implementation, it should be understood that container service(s) 630 may be implemented as part of operating system 632 in some examples. When read and executed by processing system 650 the operating software on storage system 645 directs host computing system 600 to operate as described herein.

In at least one implementation, virtual machines 620-623 execute on host computing system 600 to provide a platform for containers 625-528. Virtual machines 620-623 may represent virtual machines optimized to support containers or may represent some other virtual machine. Virtual machines 620-623 may execute on an operating system or standalone hypervisor capable of supporting the virtualization of hardware for the virtual machines. In providing the platform for containers 625-628, virtual machines 620-623 may include a container runtime, wherein the container runtime may include services for networking, resource management, or some other service to support the container.

During the execution of virtual machines 620-623, update process 632 directs processing system 650 to identify a request to update the container runtime, wherein the request may be initiated by a user, may be initiated by an updated received by host computing system 600 from an external server or computing system, or initiated in some other manner. In response to the request, update process 632 directs processing system 650 to identify the virtual machines with the container runtime that is to be updated and, for each of the virtual machines, initiate a replacement virtual machine. For example, virtual machines 620-623 may include a container runtime for containers 625 that is to be updated. Consequently, update process 632 may initiate new virtual machines for each of virtual machines 620-623 to support the update. The initiation of each of the replacement virtual machines may occur in parallel, in serial, or some combination thereof.

In one example of updating the runtime associated with container 625, update process 632 may direct processing system 650 to initiate a standby virtual machine with a replacement container for container 625, wherein the standby virtual machine includes an updated runtime for the standby container. The updated runtime may be included as part of the image for the replacement virtual machine or may be made available by initiating the standby virtual machine and subsequently updating the runtime in the standby virtual machine to support the replacement container.

Once the updated runtime is available on the replacement virtual machine for the replacement container, update process 632 may direct processing system 650 to execute the replacement container using the same root filesystem as container 625 and mount any required volumes that are also mounted to container 625. In some implementations, the host may maintain a record of the root filesystem associated with each of the containers and select the corresponding root filesystem to initiate each of the containers. Once the container is executable using the required filesystem and associated data, update process 632 may initiate one or more modifications to the networking configuration on at least host computing system 600. The update may be used to update port forwarding, a virtual switch, a firewall, or some other network configuration to communicate packets to the standby container in place of container 625. In at least one example, update process 632 may direct processing system 645 to update a port forwarding for a port associated with communication interface 660. For example, a port forwarding configuration may initially permit that packets received on port 8080 to be forwarded to the IP address associated with virtual machine 620 and container 625. To update the port forwarding configuration, update process 632 may identify an IP address associated with the standby virtual machine and update the port forwarding configuration to forward packets received on port 8080 to the IP address associated with the standby virtual machine (using network address translation). Once the networking configuration is updated to use the virtual machine with the updated container runtime in place of the virtual machine with the older version container runtime, the container executing with the older version of the container runtime may be retired. The retirement process may include unmounting any volumes for the container, stopping execution of the container and virtual machine, or some other operation to retire the older virtual machine and container.

As the containers are updated by update process 632, update process 632 may monitor for the completion of the update. This may be identified when no original container is executing or using the initial version of the container runtime. In response to identifying that the update is completed, update process 632 may delete or remove the data associated with the previous version of the container runtime. In some implementations, host computing system 600 may maintain multiple versions of the container runtime and may delete the version that is no longer required by the containers. In other examples, only portions of the runtime may be deleted or removed from host computing system 600.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   identifying a request to update a container runtime from a first version to a second version for a first container executing in a first virtual machine, wherein the first container uses a first root filesystem;
   initiating execution of a second container in a second virtual machine with the second version of the container runtime, wherein the second container uses the first root filesystem;
   updating a networking configuration to direct communications to the second container in place of the first container; and
   stopping execution of the first container.

2. The method of claim 1, wherein initiating the execution of the second container comprises mounting one or more storage volumes also mounted to the first container.

3. The method of claim 1, wherein updating the networking configuration comprises updating a port forwarding configuration to forward incoming requests on a port to the second container in place of the first container.

4. The method of claim 1, wherein the first virtual machine and the second virtual machine execute on a host computing system.

5. The method of claim 1 further comprising:
   identifying one or more additional containers to update the container runtime from the first version to the second version, wherein the one or more additional containers each execute in a separate virtual machine; and
   for each container in the one or more additional containers:
      initiating execution of a standby container in a standby virtual machine with the second version of the container runtime, wherein the standby container shares a root filesystem with the container; and
      updating the networking configuration to direct communications to the standby container in place of the container.

6. The method of claim 5 further comprising:
   for each of the one or more additional containers, stopping execution of the one or more additional containers in response to updating the networking configuration.

7. The method of claim 5 further comprising:
   determining when no containers are using the first version of the container runtime; and
   deleting data associated with the first version of the container runtime.

8. The method of claim 5, wherein initiating the execution of the one or more standby containers and second container occurs in parallel or in serial.

9. The method of claim 1, wherein the second version comprises updated networking services or resource management services.

10. A computing apparatus comprising:
    a storage system;
    a processing system operatively coupled to the storage system;
    program instructions stored on the storage system that, when executed by the processing system, direct the computing apparatus to:
       identify a request to update a container runtime from a first version to a second version for a first container executing in a first virtual machine, wherein the first container uses a first root filesystem;
       initiate execution of a second container in a second virtual machine with the second version of the container runtime, wherein the second container uses the first root filesystem;
       update a networking configuration to direct communications to the second container in place of the first container; and
       stop execution of the first container.

11. The computing apparatus of claim 10, wherein initiating the execution of the second container comprises mounting one or more storage volumes also mounted to the first container.

12. The computing apparatus of claim 10, wherein updating the networking configuration comprises updating a port forwarding configuration to forward incoming requests on a port to the second container in place of the first container.

13. The computing apparatus of claim 10, wherein the first virtual machine and the second virtual machine execute on a host computing system.

14. The computing apparatus of claim 10, wherein the program instructions further direct the computing apparatus to:
    identify one or more additional containers to update the container runtime from the first version to the second version, wherein the one or more additional containers each execute in a separate virtual machine; and
    for each container in the one or more additional containers:
       initiate execution of a standby container in a standby virtual machine with the second version of the container runtime, wherein the standby container shares a root filesystem with the container; and
       update the networking configuration to direct communications to the standby container in place of the container.

15. The computing apparatus of claim 14, wherein the program instructions further direct the computing apparatus to:
    for each of the one or more additional containers, stop execution of the one or more additional containers in response to updating the networking configuration.

16. The computing apparatus of claim 14, wherein the program instructions further direct the computing apparatus to:

determine when no containers are using the first version of the container runtime; and delete data associated with the first version of the container runtime.

17. The computing apparatus of claim 14, wherein initiating the execution of the one or more standby containers and second container occurs in parallel or in serial.

18. The computing apparatus of claim 10, wherein the second version comprises updated networking services or resource management services.

19. A method comprising:

identifying a request to update a container runtime from a first version to a second version for a plurality of containers, wherein the plurality of containers each execute on a separate virtual machine;

for each container in the plurality of containers:
  initiating execution of a standby container in a standby virtual machine with the second version of the container runtime; and
  stopping execution of the virtual machine associated with the container.

20. The method of claim 19 further comprising:

for each container in the plurality of containers, updating the networking configuration to direct communications to the standby container in place of the container.

* * * * *